(12) United States Patent
Chang

(10) Patent No.: US 8,102,475 B2
(45) Date of Patent: Jan. 24, 2012

(54) TELEVISION SYSTEM WITH REPLACEABLE DISPLAY PANEL

(75) Inventor: Won-Kie Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1474 days.

(21) Appl. No.: 11/494,086

(22) Filed: Jul. 26, 2006

(65) Prior Publication Data

US 2007/0024761 A1 Feb. 1, 2007

(30) Foreign Application Priority Data

Jul. 26, 2005 (KR) .................. 10-2005-0067672

(51) Int. Cl.
*H04N 5/64* (2006.01)
(52) U.S. Cl. ........ 348/825; 348/739; 348/706; 348/552; 348/794; 348/785
(58) Field of Classification Search .................. 348/794, 348/785, 787, 789, 825, 836, 839, 831, 706, 348/739, 552; 248/917, 918, 919, 924; 312/7.2, 312/294.1; 361/724, 727
See application file for complete search history.

(56) References Cited

U.S. PATENT DOCUMENTS

| | | | | |
|---|---|---|---|---|
| 6,169,582 B1 * | 1/2001 | Lee | ................ | 348/552 |
| 6,657,622 B2 * | 12/2003 | Park | ................ | 345/205 |
| 7,088,398 B1 * | 8/2006 | Wolf et al. | ................ | 348/423.1 |

FOREIGN PATENT DOCUMENTS

| | | |
|---|---|---|
| CN | 2548376 | 4/2003 |
| CN | 2664842 | 12/2004 |
| JP | 07-264521 A | 10/1995 |
| JP | 2000-321989 | 11/2000 |
| JP | 2004-320426 | 11/2004 |
| KR | 2002-0011043 | 2/2002 |
| KR | 20-0327920 | 9/2003 |
| KR | 20-0327928 | 9/2003 |
| KR | 2003-0094458 | 12/2003 |
| KR | 10-2004-0019230 A | 3/2004 |
| KR | 10-2004-0047387 A | 6/2004 |
| KR | 10-2004-0052292 A | 6/2004 |
| KR | 20-0385338 | 5/2005 |

OTHER PUBLICATIONS

Patent Abstracts of Japan, Publication No. 2000-321989, Nov. 24, 2000, 1 p.
Patent Abstracts of Japan, Publication No. 2004-320426, Nov. 11, 2004, 1 p.
Korean Patent Abstracts, Publication No. 1020020011043, Feb. 7, 2002, 1 p.

(Continued)

*Primary Examiner* — Jefferey Harold
*Assistant Examiner* — Jean W Desir
(74) *Attorney, Agent, or Firm* — Innovation Counsel LLP

(57) ABSTRACT

A television system comprises a display panel holder for detachably holding a display panel for displaying images, and a signal processing module for receiving and processing signals containing displayable information from various external sources and supplying the signals to the display panel. The system enables the size of the display screen of an existing TV set to be easily increased in a cost-effective manner, thereby preventing a waste of resources.

9 Claims, 7 Drawing Sheets

OTHER PUBLICATIONS

Korean Utility Model Abstract, Patent No. 20-0327920, Sep. 16, 2003, 1 p.

Korean Utility Model Abstract, Patent No. 20-0327928, Sep. 16, 2003, 1 p.

Korean Patent Abstracts, Publication No. 1020030094458, Dec. 12, 2003, 1 p.

Korean Utility Model Abstracts, Patent No. 20-0385338, May 19, 2005, 1 p.

* cited by examiner

TELEVISION SYSTEM WITH REPLACEABLE DISPLAY PANEL

RELATED APPLICATIONS

This application claims priority of Korean Patent Application No. 10-2005-0067672, filed Jul. 26, 2005, the entire contents of which are incorporated herein by reference.

BACKGROUND

This invention relates to television systems, in general, and in particular, to a television system having a flat display panel.

Television (TV) is the most common household electric appliance and constitutes a universalized medium for broadcasting audiovisual information. Recently TVs have been used not only as a broadcast medium, but also as computer monitors, as playback equipment for a video-tape recorders (VRTs) and digital video disks (DVDs), and as a digital video interactive (DVI) medium, thereby substantially broadening their range of use.

Historically, cathode ray tubes (CRTs) were used as TV display devices, but more recently, flat panel displays, such as liquid crystal displays (LCDs), plasma display panel (PDPs), and organic light emitting displays (OLEDs) have begun to be used as TV display devices, and are rapidly replacing the CRTs as the TV display device of choice.

Some of the benefits of using flat panel displays as a TV's display device include its small thickness, low weight and the fact that a much larger display area can be provided, compared to those of a conventional CRT. With the rapid, continuous increase in available display screen sizes, the demand for "wide screen" TVs has increased correspondingly.

However, since a TV set includes not only a display device, but also a loudspeaker and a tuner integrated into a single unit, when a wider display screen is desired, the entire TV set must be replaced with a new unit. The replacement of the entire TV set is needlessly expensive, and entails discarding expensive components that are otherwise still entirely functional, and thus constitutes a profligate waste of resources.

BRIEF SUMMARY

In accordance with the present invention, a television system is provided that enables the size of the display screen of an existing TV set to be increased in a cost effective manner, thereby preventing the waste of resources.

In accordance with an exemplary embodiment thereof, the television system includes a display panel holder for detachably holding a display panel for displaying images, and a signal processing module for receiving and processing signals containing various information from external sources, and for coupling the processed signals to the display panel.

According to one aspect of the present invention, the television system includes a display panel that is detachably fixed to the display panel holder and easily decoupled from the signal processing module. The display panel comprises a flat panel display, such as a liquid crystal display, a plasma display panel, an organic light emitting display, a field emission display, or the like. The display panel holder and the signal processing module can be incorporated into a single unit, or decorative housing, that forms a support for the panel.

According to another aspect of the present invention, the signal processing module includes a TMDS receiver, a TMDS transmitter, a scaler/micom, a DVI signal input unit, a PC signal input unit, a video signal input unit, a video decoder, a de-interlacer, an A/D converter, a tuner, and a demod/signal processor. The TMDS receiver can be incorporated with the display panel support housing in a single unit that forms a support, and the signal processing module can comprise a second module that includes the TMDS transmitter, scaler-micom, DVI signal input unit, PC signal input unit, video signal input unit, video decoder, de-interlacer, A/D converter, tuner, and demod/signal processor.

A better understanding of the above and many other features and advantages of the television system of the present invention may be obtained from a consideration of the detailed description of the exemplary embodiments thereof below, particularly if such consideration is made in conjunction with the several views of the appended drawings, wherein like reference numerals are used to identify like elements illustrated in one or more of the figures thereof.

DETAILED DESCRIPTION

Figure 1:
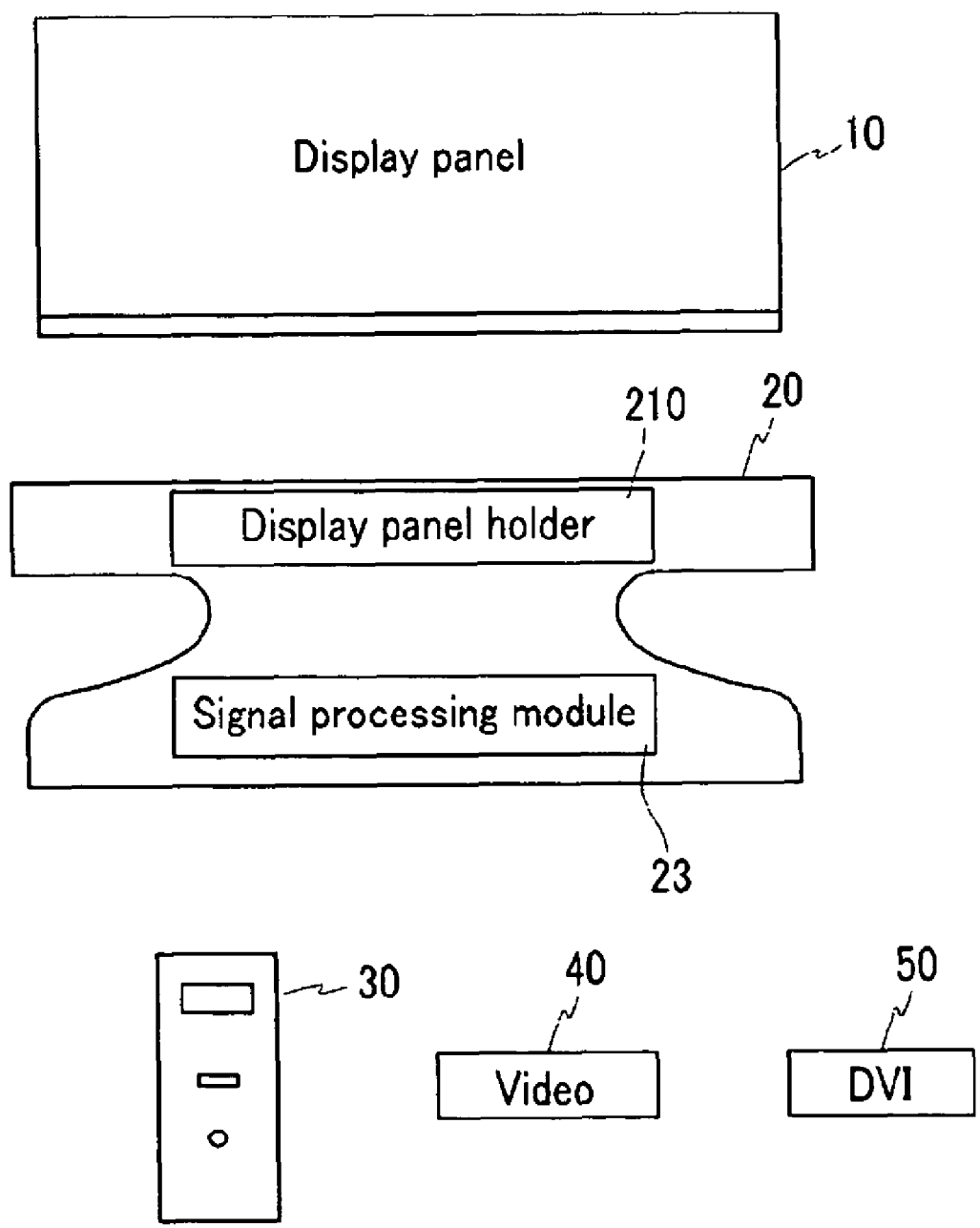
FIG. 1 is a schematic view of an exemplary embodiment of a TV system in accordance with the present invention.
Figure 2:
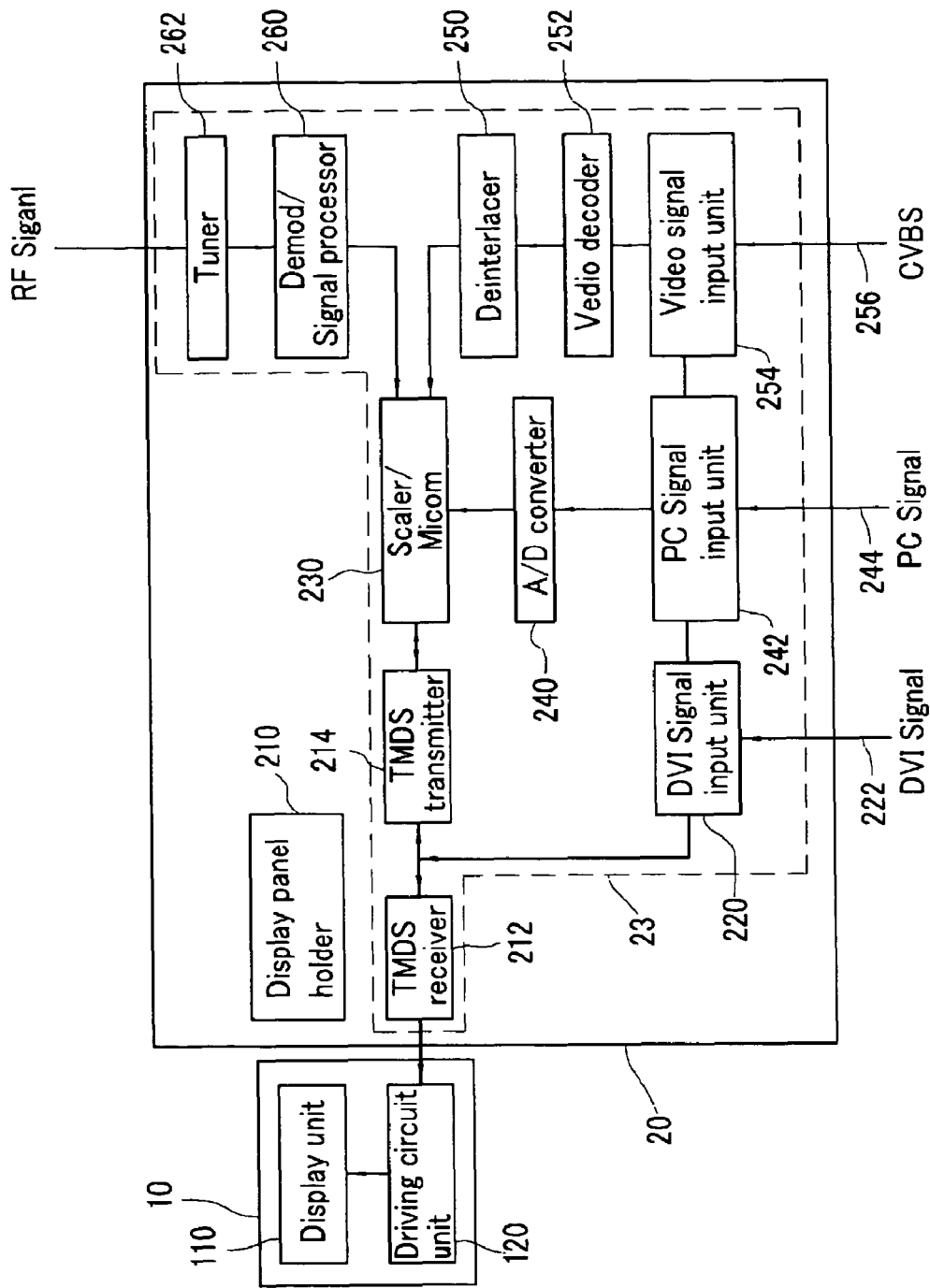
FIG. 2 is a functional block diagram of the TV system of FIG. 1.

FIG. 1 is a schematic view of an exemplary embodiment of a TV system in accordance with the present invention, and FIG. 2 is a functional block diagram thereof. As shown in FIG. 1, the exemplary TV system includes a display panel 10 and a panel support 20, as well as various examples of equipment that are capable of being utilized with the TV system, including a personal computer (PC) 30, a video player 40, and a DVI device 50. As shown in FIG. 2, the display panel 10 includes a display unit 110 for displaying images, and a driving circuit unit 120 for driving the display unit 110 to display the target images.

The panel support 20 includes a panel holder 210 for detachably holding the display panel 10, and a signal processing module 23 for receiving picture and sound signals from the external equipment, such as the PC 30, the video player 40, and the DVI device 50, as well as broadcast or cablecast signals, to process the signals suitably and supply them to the display panel 10 for display.

The panel holder 210 is preferably configured to accommodate display panels 10 of various sizes, and includes a coupling member for easily coupling and decoupling the display panel 10 to the support 20. The display panel 10 can be coupled to the panel holder 210 by, for example, a coupling member comprising conventional threaded fasteners, or alternatively, a coupling member comprising a slot- or rectangular-shaped frame having a size that can be easily varied to accommodate display panels of various sizes. Various other coupling members may also be used.

The signal processing module 23 includes a transition-minimized differential signaling (TMDS) receiver 212, a TMDS transmitter 214, a scaler microcomputer (scaler/micom) 230, a DVI signal input unit 220, a PC signal input unit 242, a video signal input unit 254, a video decoder 252, a de-interlacer 250, an analog-to-digital (A/D) converter 240, a tuner 262, and a demodulator/signal processor (demod/signal processor) 260.

The video signal input unit 254 of the signal processing module 23 is formed with a jack to receive video signals 256, such as composite video baseband signals (CVBS), S-video signals, and YPbPr signals from an external signal source, such as a VTR or a DVD device. The video decoder 252 decodes the signals input to the video signal input unit 254, and the de-interlacer 250 converts the decoded video signals for interlaced scanning into video signals for sequential scanning.

The PC signal input unit 242 incorporates a jack suitable for receiving analog image signals input from an external PC, and control signals 244. The A/D converter 240 converts the signals that are input into the PC signal input unit 242 into digital signals and then outputs the converted signals.

The DVI signal input unit 220 is formed with a jack, and receives TMDS-converted DVI signals 222 from an external signal source and transmits them to the TMDS receiver 212 without further processing.

The tuner 262 receives RF signals through standard broadcast, cablecast, or satellite broadcast channels, and converts them into an intermediate frequency (IF) output signal. The demod/signal processor 260 processes the IF signal of the relevant channel to output it as an image signal.

The scaler/micom 230 converts the signals that are output from the de-interlacer 250, the A/D converter 240, and the demod/signal processor 260 in conformity with the resolution of the display panel 10 and transmits them to the TMDS transmitter 214, and also functions to control the signal processing module 23. In the exemplary embodiments described herein, the scaler/micom 230 is shown combined in a single chip or integrated circuit (IC), but the scaler and the micom may also be implemented separately from each other.

The TMDS transmitter 214 converts the signals that are transmitted from the scaler/micom 230 into a TMDS transmission format for transmission to the TMDS receiver 212. The TMDS receiver 212 reversely TMDS-converts the image signals input from the TMDS transmitter 214 and transmits them to the driving circuit unit 120 of the display panel 10.

The driving circuit unit 120 drives the display unit 110 in accordance with the signals transmitted from the TMDS receiver 212 to display images.

Figure 3:
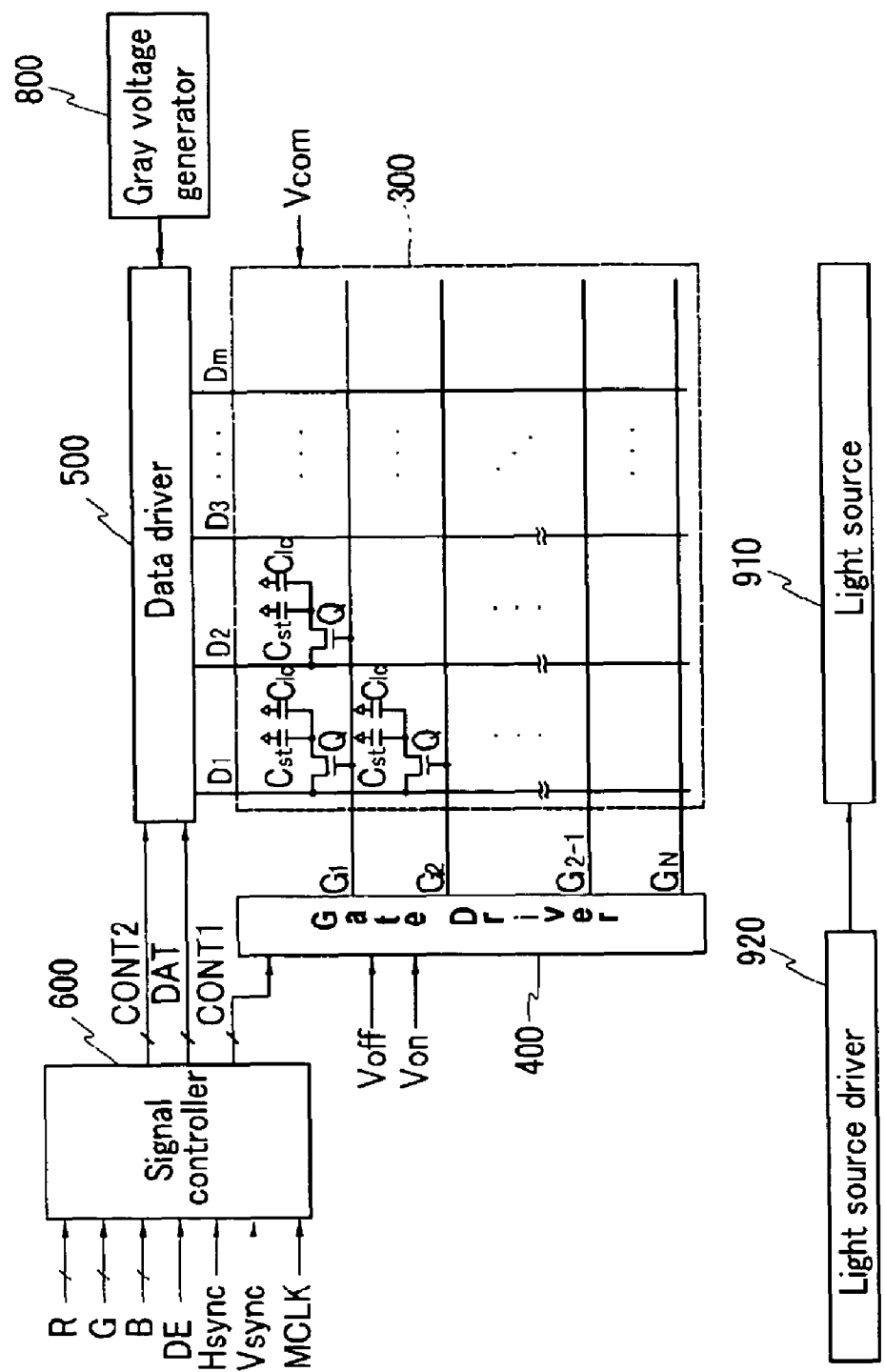
FIG. 3 is a functional block diagram of an LCD being used in the TV system of FIG. 1.
Figure 4:
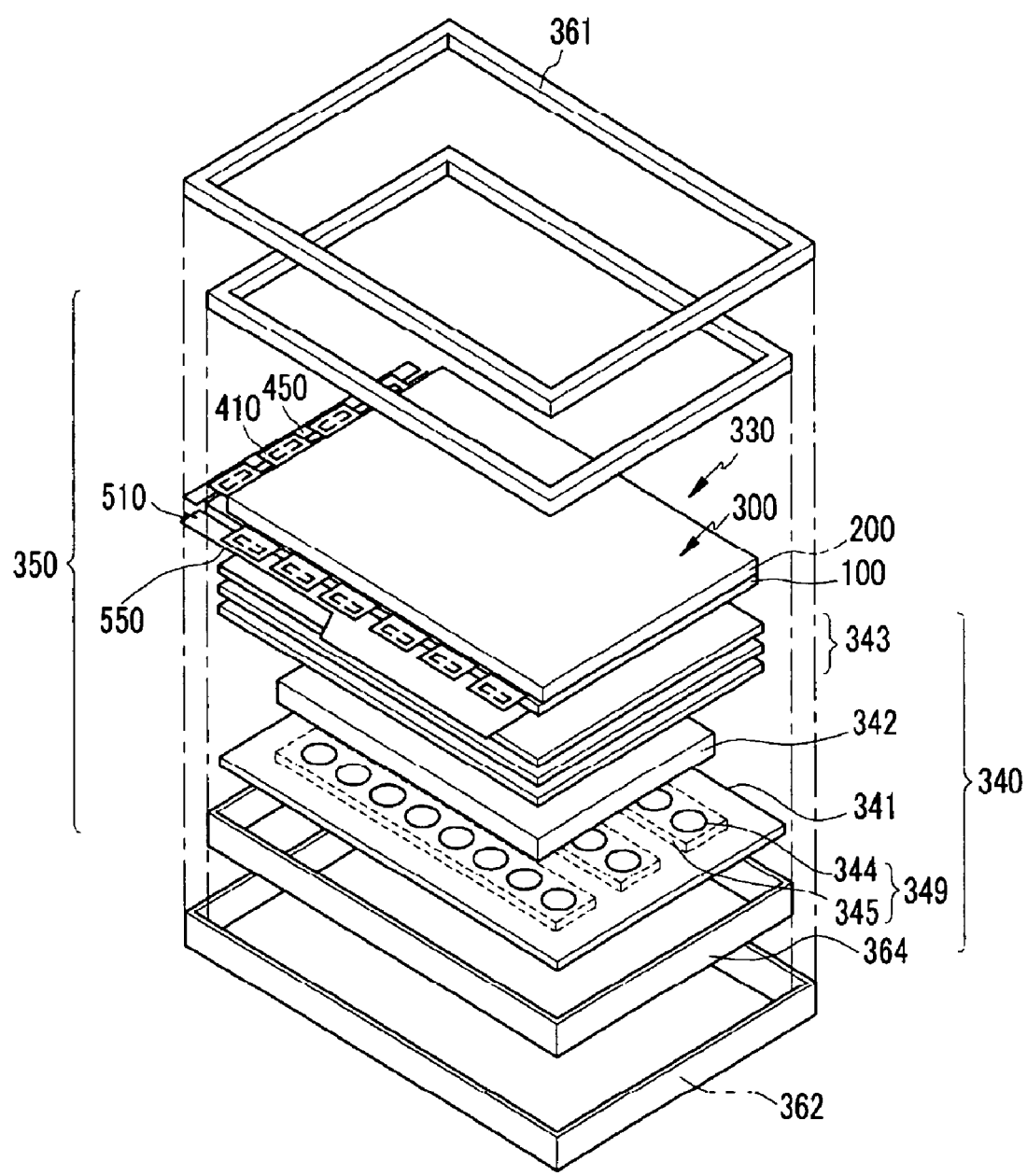
FIG. 4 is an exploded perspective view of the LCD of FIG. 3.
Figure 5:
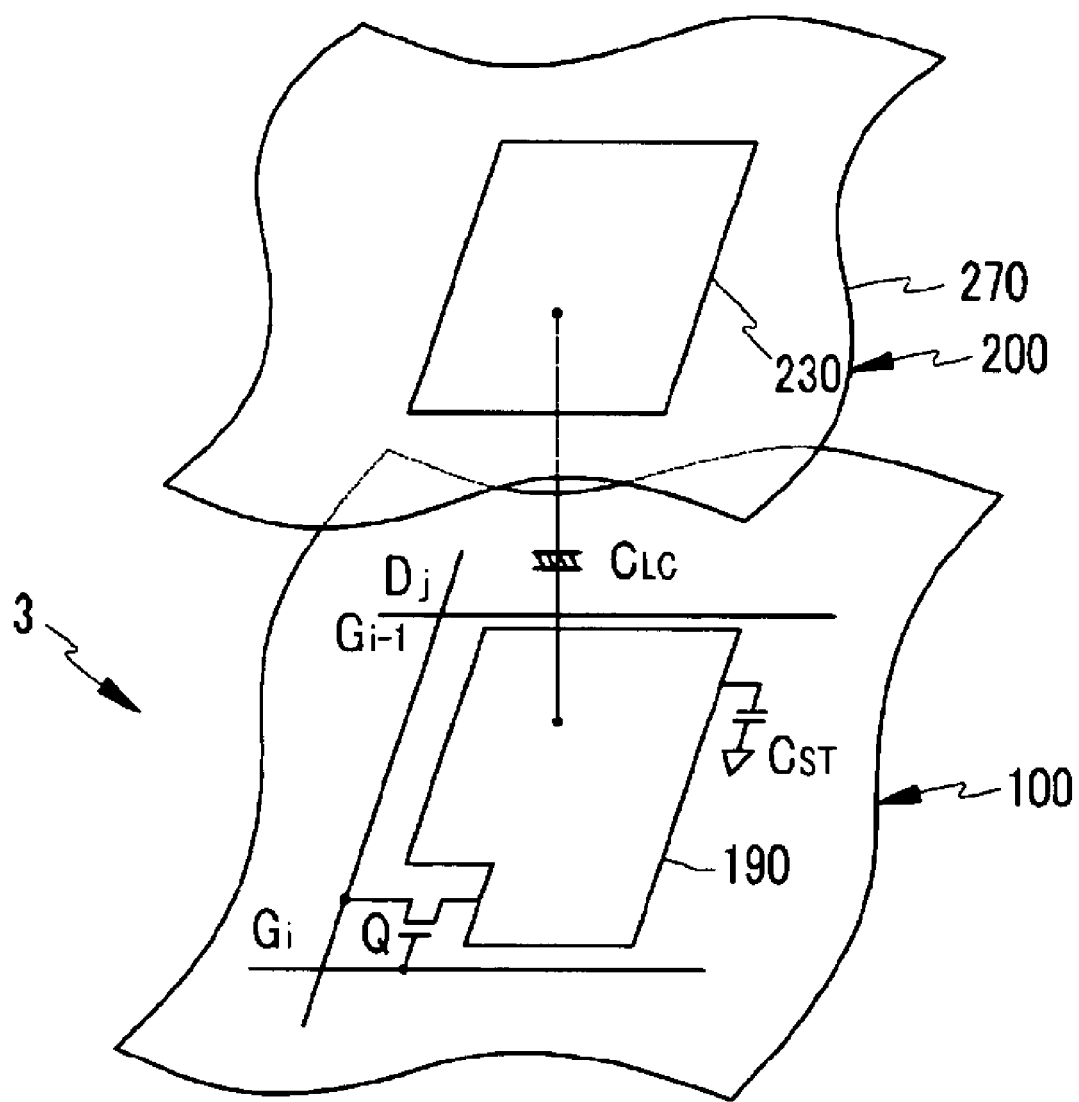
FIG. 5 is a schematic equivalent circuit diagram of a pixel of the LCD of FIG. 3.

FIG. 3 is a functional block diagram of a liquid display (LCD) panel 10 used in the TV system of FIG. 1, and FIG. 4 is an exploded perspective view of the LCD shown in FIG. 3. FIG. 5 is an equivalent circuit diagram of a single pixel of the LCD. As shown in FIG. 3, an LCD according to a first exemplary embodiment of the present invention includes a liquid crystal panel assembly 300, gate and data drivers 400 and 500 connected to the liquid crystal panel assembly 300, a gray voltage generator 800 connected to the data driver 500, a light source 910 and a light source driver 920 for providing illumination to the back of the liquid crystal panel assembly 300, and a signal controller 600 for controlling the foregoing components.

As illustrated in FIG. 4, the exemplary LCD panel includes a liquid crystal module 350 with a display unit 330 and a backlight unit 340, front and rear chassis 361 and 362, and a molded frame 364 for receiving and fixing the liquid crystal module 350 in the panel.

The display unit 330 includes a liquid crystal panel assembly 300, a plurality of gate tape carrier packages (TCPs) 410 and data TCPs 510 attached to the panel assembly 300, and a gate printed circuit board (PCB) 450 and a data PCB 550 attached to the respective gate and data TCPs 410 and 510.

As shown in FIGS. 4 and 5, from a structural perspective, the liquid crystal panel assembly 300 includes a lower panel 100, an upper panel 200, and a liquid crystal layer 3 disposed between the two panels. As illustrated in FIGS. 3 and 5, from an equivalent circuit perspective, the liquid crystal panel assembly 300 includes a plurality of display signal lines G1-Gn and D1-Dm, and a plurality of pixels respectively connected to the signal lines and arranged in the form of a two-dimensional matrix.

The display signal lines G1-Gn and D1-Dm are provided on the lower panel 100, and include a plurality of gate lines G1-Gn for carrying gate signals (also called "scanning signals") to the pixels, and data lines D1-Dm for carrying data signals thereto. The gate lines G1-Gn extend in a row direction and parallel to each other, whereas, the data lines D1-Dm extend in a column direction and parallel to each other, as illustrated in FIG. 3.

Each pixel has a switching element Q respectively connected to each of the display signal lines G1-Gn and D1-Dm, and a liquid crystal capacitor Clc and a storage capacitor Cst connected to the switching element Q. In some embodiments, the storage capacitor Cst may be omitted.

The switching element Q, such as a thin film transistor (TFT), is provided on the lower panel 100. The switching element Q is a "triode" device, with a control terminal connected to a respective one of the gate lines G1-Gn, an input terminal connected to a respective one of the data lines D1-Dm, and an output terminal connected to a respective one of the liquid crystal capacitors Clc and storage capacitors Cst.

The liquid crystal capacitor Clc takes a pixel electrode 190 of the lower panel 100 and a common electrode 270 of the upper panel 200 as its two terminals, and the liquid crystal layer disposed between the two electrodes 190 and 270 functions as its dielectric. The pixel electrode 190 is connected to the switching element Q, and the common electrode 270 is formed on the entire surface of the upper panel 200 to receive a common voltage, Vcom. Alternatively, and unlike the structure shown in FIG. 3, the common electrode 270 can be provided on the lower panel 100, and in such case, at least one of the two electrodes 190 and 270 may be formed in the shape of a line or a bar.

The storage capacitor Cst, which is subsidiary to the liquid crystal capacitor Cst, is formed by overlapping a separate signal line (not shown) provided on the lower panel 100 with the pixel electrode 190 and interposing an insulator therebetween. A predetermined voltage, such as a common voltage, Vcom, is applied to the separate signal line. Alternatively, the storage capacitor Cst may be formed by overlapping the pixel electrode 190 with the immediately adjacent gate line and interposing an insulator therebetween.

To express colors, the respective pixels intrinsically express one of the three primary colors (spatial division), or alternately, can express the three primary colors in a temporal order (time division), such that the desired color is perceived as the spatial or temporal sum of the three primary colors expressed. FIG. 5 illustrates an example of spatial division color expression, wherein the respective pixels are provided with a red, green, or blue color filter 230 in the region of the upper panel 200 corresponding to the pixel electrode 190. Alternatively, and unlike the structure shown in FIG. 5, the color filter 230 may be formed over or under the pixel electrode 190 of the lower panel 100.

As illustrated in FIG. 4, the backlight unit 340 is mounted at the bottom of the liquid crystal panel assembly 300. The backlight unit 340 includes a light source member 349 containing a plurality of light emitting diodes (LEDs) 344 mounted on a printed circuit board (PCB) 345, a light guide plate 342, and a plurality of optical sheets 343 disposed between the panel assembly 300 and the LEDs 344 to diffuse the light from the LEDs to the panel assembly 300, a reflection plate 341 disposed on the PCB 345, with a plurality of holes for allowing projection of the emitters of the LEDs 344, to reflect the light from the LEDs 344 to the panel assembly 300, and a molded frame 364 disposed between the reflection plate 341 and the light guide plate 342, for maintaining the distance between the light source member 349 and the light guide plate 342 and for supporting the light guide plate 342 and the optical sheets 343.

In an alternative embodiment of the backlight unit 340 of FIG. 4, a fluorescent lamp, such as a cold cathode fluorescent (CCFL) lamp, can be used as the light source.

Polarizers (not illustrated) are attached to the outer surfaces of the two panels 100 and 200 of the liquid crystal panel assembly 300 to polarize the light from the light source member 349.

As shown in FIGS. 3 and 4, the gray voltage generator 800 is provided at the data PCB 550 to generate two sets of gray voltages related to the light transmittance of the pixels. One of the two sets has a positive value with respect to the common voltage Vcom, while the other set has a negative value.

The gate driver 400 is mounted on each gate TCP 410 in the form of an IC chip, and is connected to the gate lines G1-Gn of the liquid crystal panel assembly 300 to apply to the gate lines G1-Gn the gate signals based on the combinations of the gate on and off voltages Von and Voff from the outside.

The data driver 500 is mounted on each data TCP 510 in the form of an IC chip, and is connected to the data lines D1-Dm of the liquid crystal panel assembly 300 to apply to the data lines D1-Dm the data voltages selected from the gray voltages from the gray voltage generator 800.

Alternatively, the gate driver 400 and/or the data driver 500 may be mounted on the lower panel 100 in the form of an IC chip, or may be integrated with the lower panel 100 together with other elements. In such an embodiment, the gate PCB 450 and/or the gate TCP 410 may be omitted.

The signal controller 600 is provided on either the data PCB 550 or the gate PCB 450 to control the operation of the gate driver 400 and the data driver 500.

During operation of the LCD, the signal controller 600 receives input image signals R, G, and B and input control signals for controlling the display thereof from an external graphics controller (not shown), such as vertical synchronization signals Vsync, horizontal synchronization signals Hsync, main clock signals MCLK, and data enable signals DE. The signal controller 600 suitably processes the image signals R, G, and B based on the input image signals R, G, and B and the input control signals in conformity with the operational conditions of the liquid crystal panel assembly 300, and generates gate control signals CONT1 and data control signals CONT2 to transmit the gate control signals CONT1 to the gate driver 400 and the data control signals CONT2 and the processed image signals DAT to the data driver 500.

The gate control signals CONT1 include vertical synchronization start signals STV for the starting of a frame, gate clock signals CPV for controlling the output time of the gate on voltage Von, and output enable signals OE for defining the duration period of the gate on voltage Von.

The data control signals CONT2 include horizontal synchronization start signals STV for starting the transmission of the image data (DAT), LOAD signals for applying the relevant data voltages to the data lines D1-Dm, reverse signals RVS for inverting the polarities of the data voltages with respect to the common voltage Vcom (referred to hereinafter simply as the polarities of the data voltages), and data clock signals HCLK.

The data driver 500 sequentially receives and shifts the image data DAT for a row of pixels in accordance with the data control signals CONT2 from the signal controller 600. The data driver 500 selects the gray voltages corresponding to the respective image data DAT among the gray voltages from the gray voltage generator 800, and converts the selected image data DAT into appropriate data voltages to apply to the relevant data lines D1-Dm.

The gate driver 400 sequentially applies gate on voltages Von to the gate lines G1-Gn in accordance with the gate control signals CONT1 from the signal controller 600 to turn on the switching elements Q connected to the gate lines G1-Gn. Consequently, the data voltages applied to the data lines D1-Dm are applied to the relevant pixels through the turned on switching elements Q.

A difference between the data voltages applied to the pixels and the common voltage Vcom is represented as the charge voltage of the liquid crystal capacitor Clc, that is, by the pixel voltage. The molecules of the liquid crystal layer are realigned, depending upon the value of the pixel voltages.

A light source driver 920 controls the electric current applied to the light source 910, and turns the LEDs 344 forming the light source 910 on or off while controlling the luminance thereof. Responsive to the operation of the light source driver 920, the polarization of the light from the LEDs 344 is varied as it passes through the liquid crystal layer 3 as a function of the alignment of the liquid crystal molecules, and the variation in polarization results in a variation in the light transmitted by the polarizers.

When one horizontal cycle or "1H" (i.e., a cycle of horizontal synchronization signals Hsync, data enable signals DE, and gate clock signals CPV) is complete, the data and gate drivers 500 and 400 repeat the same operation with respect to the next row of pixels. In this way, the gate on voltages Von are sequentially applied to all the gate lines G1-Gn for one frame to thereby apply data voltages to all of the pixels. When one frame terminates, the next frame starts, and the reverse signals RVS applied to the data driver 500 are controlled such that the polarities of the data voltages applied to the respective pixels are opposite to those in the previous frame (called "frame inversion"). The polarities of the data voltages flowing along one data line may be inverted even within one frame, depending upon the characteristic of the reverse signals RVS (i.e., row inversion or dot inversion), or the polarities of the data voltages applied to a row of pixels may be different from each other (column inversion or dot inversion).

In the exemplary embodiment described above, an LCD is used as the display panel 10 of the TV system. However, as those of skill in the art will appreciate, in an alternative embodiment, a plasma display panel (PDP), an organic light emitting diode (OLED) display, or a field emission display (FED) may be used as the display panel 10 of the TV system of the present invention.

As will be further appreciated, since the display panel 10, such as an LCD, is detachably fixed to the support 20 of the TV system of the present invention, when it becomes desirable to move up to a wider display screen, only the display panel 10 itself needs to be replaced, not the remainder of the system. Furthermore, from the viewpoint of the distributor, when the used panel 10 is returned to the distributor when it is replaced, the distributor can recover and resell the used but still functional panel, thereby increasing the amount of sales and providing the distributor with an incentive to give the purchaser a discount, in the form of a "trade-in" value, for the old panel.

From the manufacturer's viewpoint, after the common signal processing modules have been sold, only the display panels alone need be sold, thereby decreasing production costs and increasing the sales volume.

Figure 6:
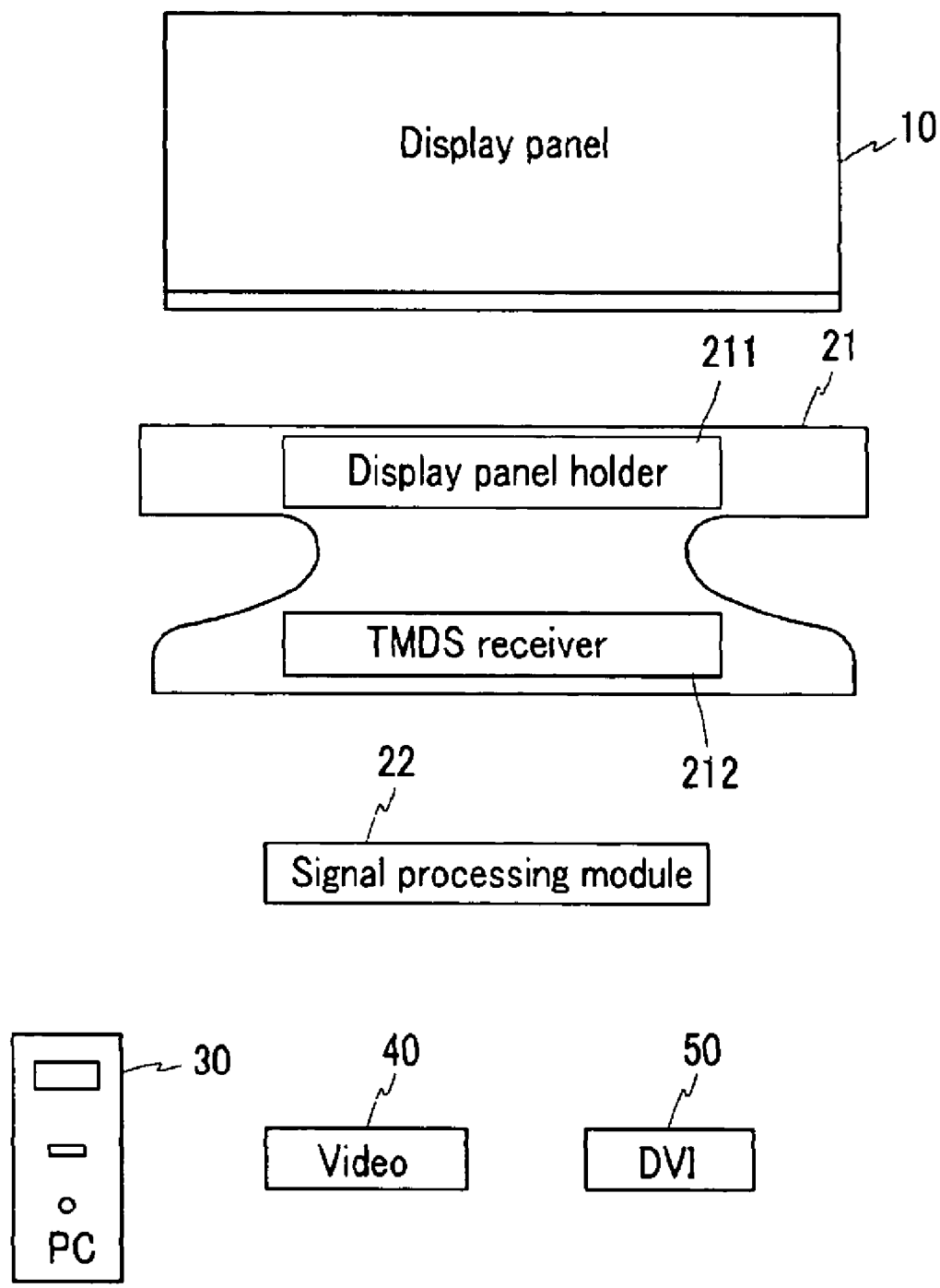
FIG. 6 is a schematic view of an exemplary alternative embodiment of a TV system in accordance with the present invention; and, FIG. 7 is a functional block diagram of the alternative TV system of FIG. 6.
Figure 7:
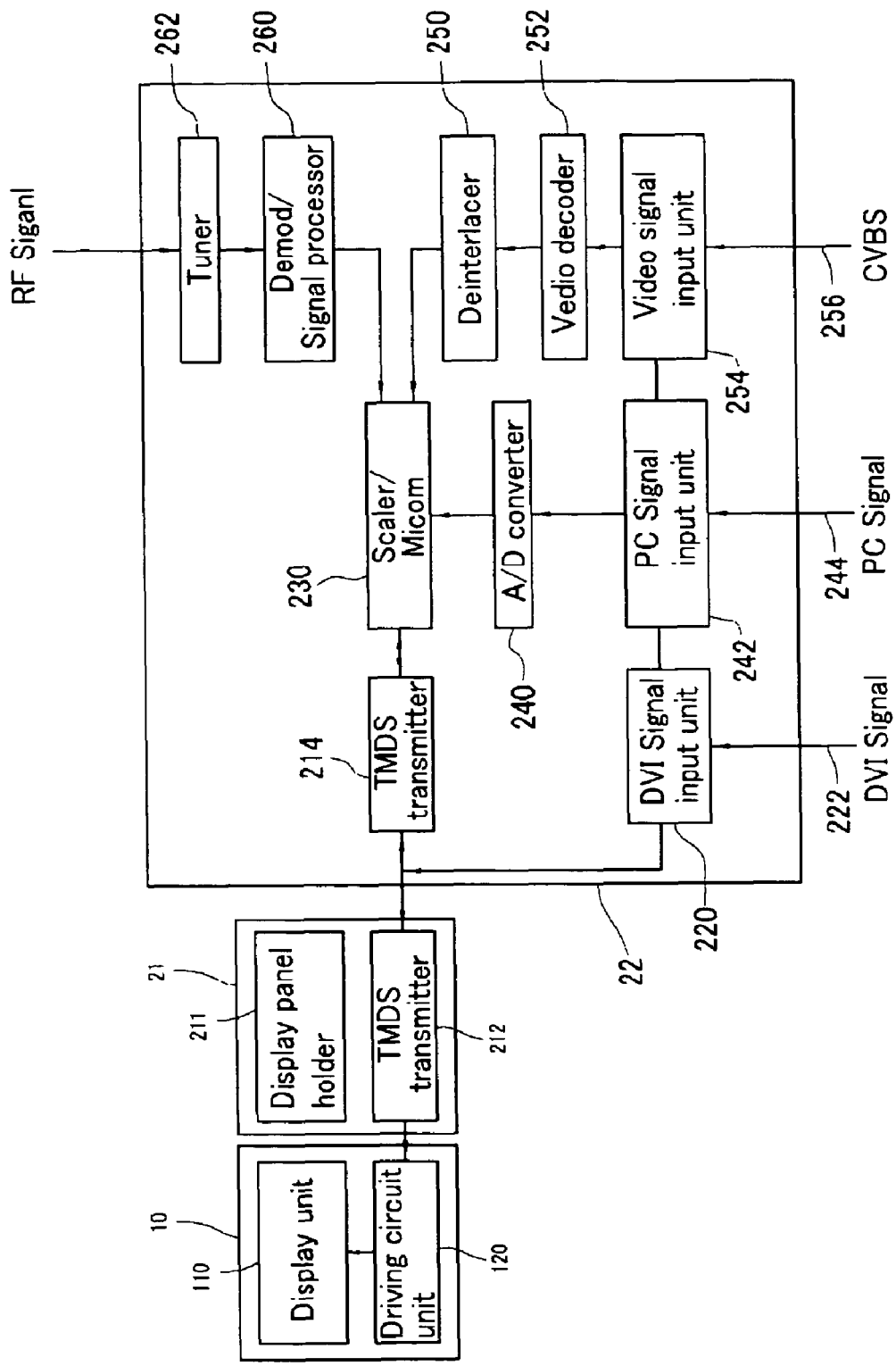

FIGS. 6 and 7 are a schematic view and a functional block diagram, respectively, of an exemplary alternative embodiment of a TV system in accordance with the present invention. The TV system of FIGS. 6 and 7 differs from that shown in FIGS. 1 and 2 in that the signal processing module 22 is separate from the support 21. That is, the support 21 comprises a panel holder 211 and a TMDS receiver 212, and the signal processing module 22 is provided separately from the former. Signal transmission may be made between the signal processing module 22 and the TMDS receiver 212 by means of either wired or wireless communication.

If the support 21 and the signal processing module 22 are provided separately from each other, the support 21 can also be easily replaced along with the display panel 10, to maintain the aesthetic harmony of the system.

In accordance with the exemplary embodiments of the present invention described herein, a television system is provided that enables the size of the display screen of an existing TV set to be increased in a cost effective manner, thereby maximizing the value of the system from the respective standpoints of the manufacturer, the distributor, and the consumer, thereby preventing the waste of valuable resources.

As those of skill in this art will by now appreciate, many modifications, substitutions and variations can be made in the materials, apparatus, configurations and methods of the TV system of the present invention without departing from its spirit and scope. For example, with reference to the structures shown in FIGS. 6 and 7, the TMDS receiver 212 may be separate from the support 21 and installed along with the signal processing module 22, such that the support 21 serves only to hold the panel and effect the electrical interconnection between the display panel 10 and the signal processing module 22. Further, the support 21 can serve only to hold the panel, with the display panel 10 and the signal processing module 22 being directly connected to each other in a wired or wireless way to effect signal transmission.

In light of the foregoing, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A television system comprising:
    a support comprises a display panel holder for detachably holding a display panel for displaying images and a transition-minimized differential signaling (TMDS) receiver, wherein the display panel holder and the TMDS receiver form a single structure; and,
    a signal processing module for receiving and processing information signals from various external sources and for supplying the processed signals to the display panel, wherein the signal processing module forms a separable structure from the support.

2. The television system of claim 1, further comprising a display panel detachably fixed to the display panel holder.

3. The television system of claim 2, wherein the display panel comprises a flat panel display.

4. The television system of claim 1, wherein the signal processing module comprises:
    a video signal input unit receiving video signals including video baseband signals;
    a video decoder decoding the video signals input through the video signal input unit, thereby generating decoded video signals;
    a de-interlacer converting the decoded video signals for interlaced scanning into video signals for sequential scanning;
    a PC signal input unit receiving analog image signals input from an external PC;
    an A/D converter converting the analog image signals into digital signals;
    a DVI signal input unit receiving TMDS-converted DVI signals from an external signal source;
    a tuner receiving RF signals standard broadcast, cablecast, or satellite broadcast channels, and converts them into an intermediate frequency (IF) output signal;
    a demod/signal processor processing the IF output signal of a relevant channel and outputting as an image signal;
    a scaler/micom converting the video signals for sequential scanning, the digital signals, and the image signal in conformity with the resolution of the display pane; and
    a TMDS transmitter converting signals that are transmitted from the scaler/micom.

5. A television system comprising:
    a support comprises a display panel holder for detachably holding a display panel for displaying images and a transition-minimized differential signaling (TMDS) receiver, wherein the display panel holder and the TMDS receiver form a single structure; and,
    a signal processing module for receiving and processing information signals from various external sources and for supplying the processed signals to the display panel wherein the signal processing module forms a separate structure from the support for decoupling the display panel and the support from the signal processing module and for coupling another display panel having a different size and support to the signal processing module.

6. The television system of claim 5, wherein the second signal processing module comprises:
    a video signal input unit receiving video signals including video baseband signals;
    a video decoder decoding the video signals input through the video signal input unit, thereby generating decoded video signals;
    a de-interlacer converting the decoded video signals for interlaced scanning into video signals for sequential scanning;
    a PC signal input unit receiving analog image signals input from an external PC;
    a A/D converter converting the analog image signals into digital signals;
    a DVI signal input unit receiving TMDS-converted DVI signals from an external signal source;
    a tuner receiving RF signals standard broadcast, cablecast, or satellite broadcast channels, and converts them into an intermediate frequency (IF) output signal;
    a demod/signal processor processing the IF output signal of a relevant channel and outputting as an image signal;
    a scaler/micom converting the video signals for sequential scanning, the digital signals, and the image signal in conformity with the resolution of the display pane;
    a TMDS transmitter converting signals that are transmitted from the scaler/micom.

7. The television system of claim 5, wherein the coupling and decoupling means comprises wired or wireless coupling and decoupling.

8. The method of claim 7, wherein at least one of the first and second display panels comprises an LCD, a PDP, an OLED or a FED panel.

9. A method for making a TV system, the method comprising:
   providing a first display panel for displaying images corresponding to information signals supplied to the system from external sources;
   providing a support comprising a display panel holder for detachably holding the first display panel and a transition-minimized differential signaling (TMDS) receiver, wherein the display panel holder and the TMDS receiver form a single structure;
   providing a signal processing module for receiving, processing and supplying the information signals to the first display panel wherein the signal processing module forms a separable structure from the support; and,
   coupling the first display panel to the support and the signal processing module such that the first display panel can be decoupled from the support and the signal processing module and replaced with a second display panel having a different size than the first display panel.

* * * * *